United States Patent
Charlat

(10) Patent No.: US 7,077,885 B2
(45) Date of Patent: Jul. 18, 2006

(54) GAS/LIQUID PHASE SEPARATOR AND THE FUEL CELL-BASED POWER PRODUCTION UNIT EQUIPPED WITH ONE SUCH SEPARATOR

(75) Inventor: Pierre Charlat, Lans-en-Vercors (FR)

(73) Assignee: L'Air Liquide, Societe Anonyme A Directoire et Conseil De Surveillance Pour L'Etude et L'Exploitation Des Procedes Georges Claude, Paris (FR)

( * ) Notice: Subject to any disclaimer, the term of this patent is extended or adjusted under 35 U.S.C. 154(b) by 111 days.

(21) Appl. No.: 10/489,721

(22) PCT Filed: Aug. 5, 2002

(86) PCT No.: PCT/FR02/02801

§ 371 (c)(1),
(2), (4) Date: Mar. 12, 2004

(87) PCT Pub. No.: WO03/024554

PCT Pub. Date: Mar. 27, 2003

(65) Prior Publication Data

US 2004/0237778 A1 Dec. 2, 2004

(30) Foreign Application Priority Data

Sep. 20, 2001 (FR) .................................. 01 12154

(51) Int. Cl.
B01D 53/22 (2006.01)
H01M 8/04 (2006.01)

(52) U.S. Cl. .................... 95/52; 95/268; 55/385.1; 55/456; 55/520; 55/337; 96/7; 429/12

(58) Field of Classification Search ............... 55/385.1, 55/399, 456, 520, 337; 95/52, 268, 269; 96/4, 7; 429/12, 13
See application file for complete search history.

(56) References Cited

U.S. PATENT DOCUMENTS

| | | | |
|---|---|---|---|
| 2,747,687 A | 5/1956 | Rupert | |
| 3,256,678 A * | 6/1966 | Bertin et al. ....................... | 96/4 |
| 3,890,123 A | 6/1975 | Kuga | |
| 3,922,220 A * | 11/1975 | Middleman et al. ......... | 210/650 |
| 5,466,384 A * | 11/1995 | Prevost et al. ............... | 210/787 |
| 5,989,318 A * | 11/1999 | Schroll ........................... | 96/6 |
| 6,117,577 A * | 9/2000 | Wilson ......................... | 429/17 |
| 6,406,805 B1* | 6/2002 | James et al. ................... | 429/13 |
| 6,821,662 B1* | 11/2004 | Charlat et al. ................ | 429/17 |
| 2003/0190502 A1* | 10/2003 | Illner et al. .................... | 429/13 |

FOREIGN PATENT DOCUMENTS

GB 2 194 180 3/1988
JP 60-082107 A * 5/1985

* cited by examiner

Primary Examiner—Frank M. Lawrence
(74) Attorney, Agent, or Firm—Linda K. Russell

(57) ABSTRACT

A gas and liquid phase separator apparatus and an apparatus for energy production based on fuel cells within the phase separator.

13 Claims, 4 Drawing Sheets

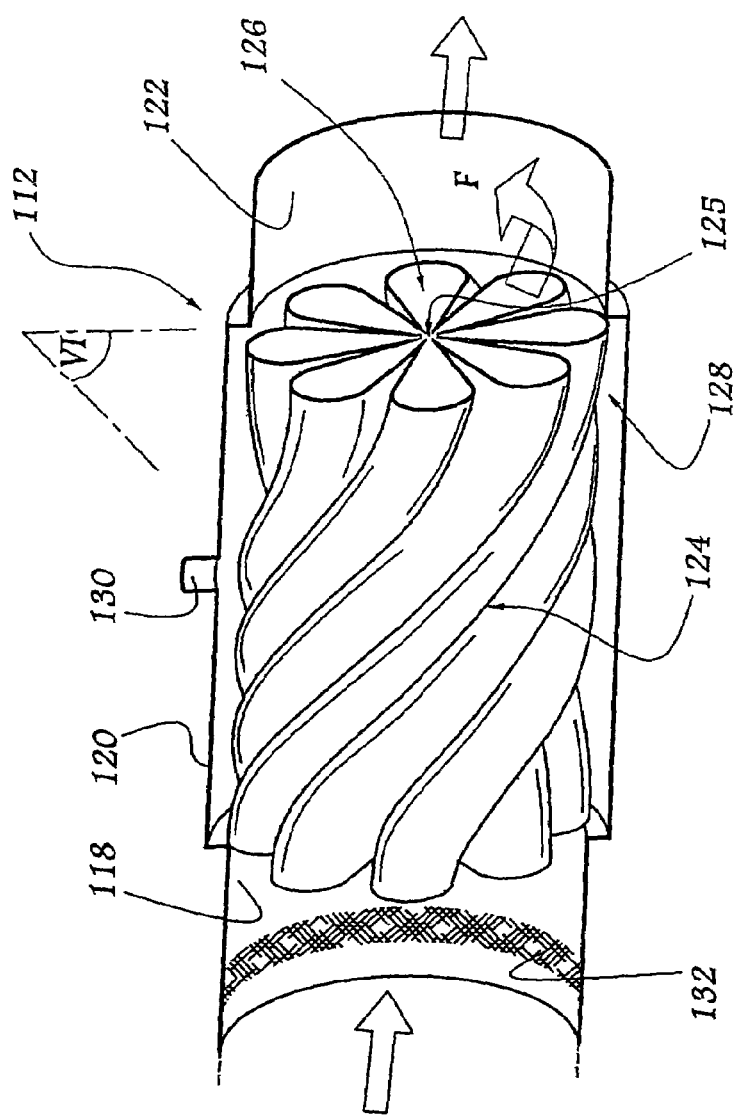
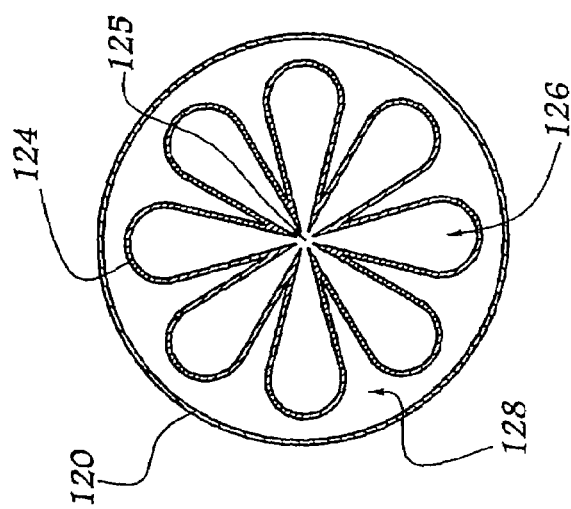
Fig.5
Fig.6

GAS/LIQUID PHASE SEPARATOR AND THE FUEL CELL-BASED POWER PRODUCTION UNIT EQUIPPED WITH ONE SUCH SEPARATOR

BACKGROUND OF THE INVENTION

1. Field of the Invention

The present invention relates to a gas and liquid phase separator as well as to an assembly for energy production based on fuel cells, which is provided with such a phase separator.

2. Related Art

Gas and liquid phase separators are used in many industrial applications, especially in the field of energy production based on fuel cells.

Conventionally, an assembly for energy production based on fuel cells comprises a cell block, which has an anode compartment in which the oxidation of hydrogen takes place, as well as a cathode compartment in which the oxygen in air is reduced, with water being produced.

It is in this case known to provide a gas separator downstream of the cathode compartment, making it possible to separate the oxygen-depleted air and the water which are discharged from this cathode compartment. It is also possible to provide another phase separator in the outlet line of the anode compartment, which carries a mixture of hydrogen and water.

SUMMARY OF THE INVENTION

It is an object of the invention to provide a phase separator which is advantageous in terms of compactness and which can be used, in particular but not exclusively, in an assembly for energy production based on fuel cells.

To this end it relates to a gas and liquid phase separator comprising a body, an inlet for a diphasic mixture containing gas and liquid to be separated, a gas outlet and a liquid outlet, characterized in that it furthermore comprises a hydrophilic structure which is arranged in the body and delimits an internal space and an external space with respect to this body, in that means are provided for creating vortices in the diphasic mixture when it is flowing through said internal space, so as to recover the liquid against the walls of said hydrophilic structure, in that the gas outlet is in communication with the internal space, and in that the liquid outlet is in communication with the external space.

According to other characteristics of the invention:
- the means for producing vortices comprise a profiled auxiliary member, in particular an impeller;
- the means for producing vortices consist of said hydrophilic structure.

The invention also relates to an assembly for energy production based on fuel cells, comprising a fuel cell block which has a cathode compartment, an anode compartment, at least two gas feed circuits and at least two discharge circuits, each of which makes it possible to discharge a mixture of gas and water from the cell block, this assembly being characterized in that at least one discharge circuit leads into a gas and liquid phase separator as defined above.

BRIEF DESCRIPTION OF THE DRAWINGS

The invention will be understood more clearly on reading the following description, which is given solely by way of nonlimiting example and refers to the appended drawings, in which:

FIG. 5 is a view in section similar to FIGS. 1 and 2, illustrating a phase separator according to another alternative embodiment of the invention; and FIG. 6 is a view in section on the line VI—VI in FIG. 4.

DESCRIPTION OF PREFERRED EMBODIMENTS

Figure 1:
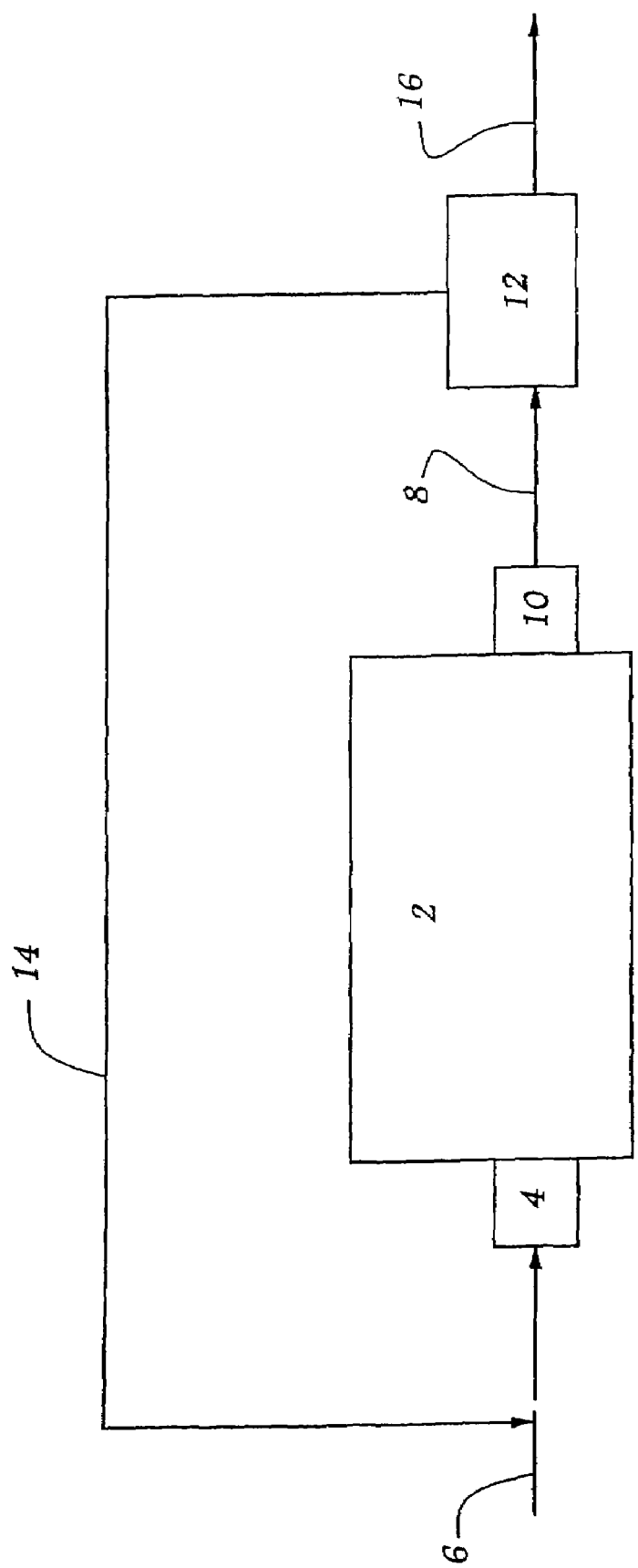
FIG. 1 is a schematic view illustrating an assembly for energy production based on fuel cells, which is equipped with a phase separator according to the invention.

The energy production assembly schematically represented in FIG. 1 comprises a fuel cell block, which has a cathode 2 as well as an anode (not shown).

This cathode compartment 2 receives an air feed circuit 6 at an inlet 4. A circuit 8 furthermore makes it possible to discharge a mixture of oxygen-depleted air and water from the outlet 10 of this cathode.

The discharge circuit 8 leads into a separator 12, making it possible to separate the gas and liquid phases of the aforementioned mixture. A line 14 makes it possible to recycle the water separated from this mixture back to the inlet of the cathode 2. The separated gas phase, essentially consisting of oxygen-depleted air, is furthermore discharged via a line 16.

The fuel cell block is also equipped with two additional circuits (not shown), respectively for supplying the anode with hydrogen and for discharging the depleted hydrogen mixed with water from this anode. This discharge circuit may also lead into another phase separator (not shown) similar to the one 12.

Figure 2:
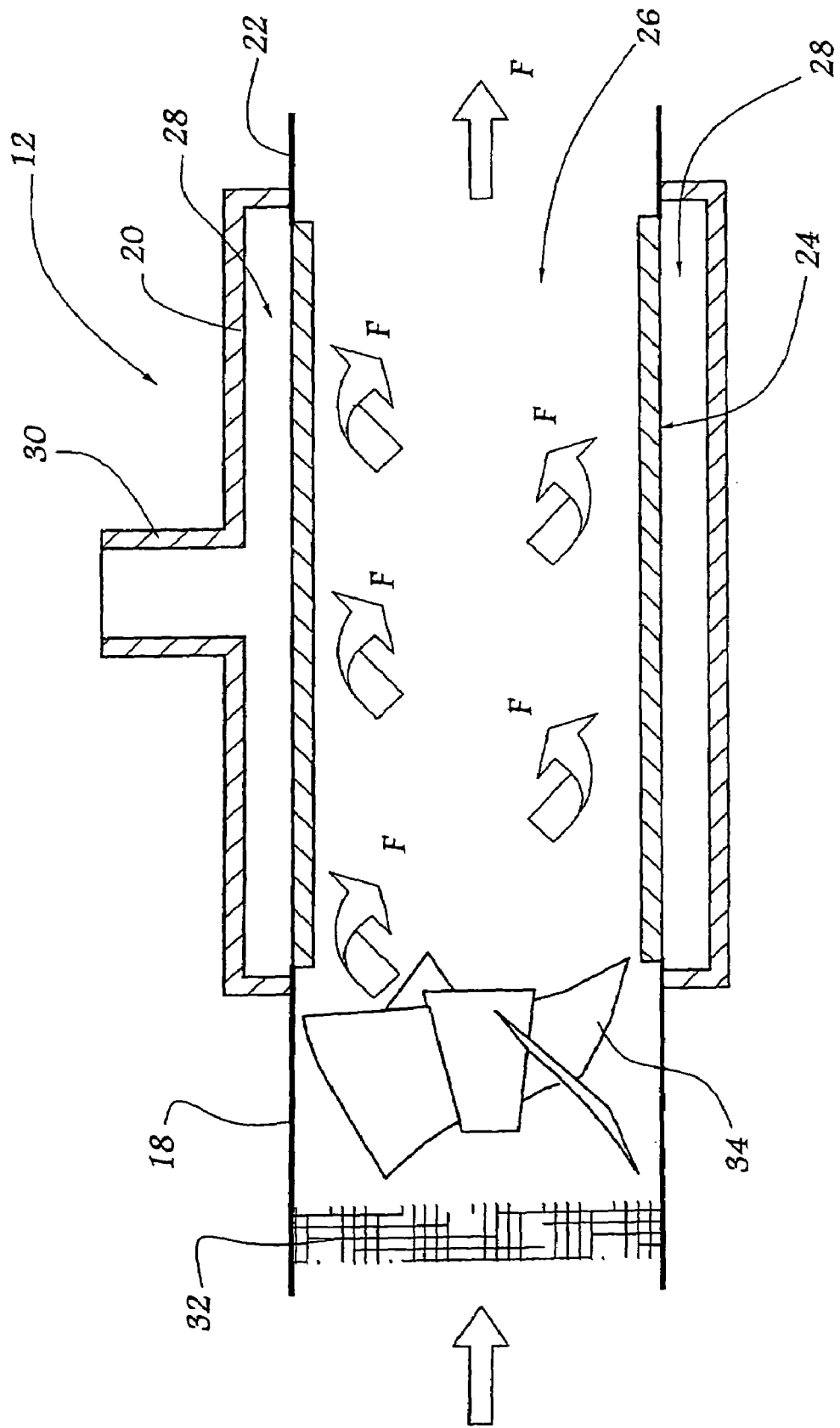
FIG. 2 is a view in diametral section illustrating this phase separator more precisely.

Referring now to FIG. 2, the phase separator 12 comprises an inlet 18 placed in communication with the discharge circuit 8. This tubular inlet 18 extends into a cylindrical body 20, which is coaxial with this inlet but has a larger diameter.

The body 20 ends in an outlet 22, which is coaxial with the inlet 18 and has a similar diameter. This body contains a hydrophilic membrane 24, which is arranged so as to form a cylinder coaxial with the inlet 18 and the outlet 22, and with the same diameter as them. The membrane 24, for example made of polyethylene or nylon, is to this end held in place by seals and clamping.

This membrane hence defines two spaces in the body of the separator, respectively an internal space 26 and an external space 28.

The external space 28, which is annular, is placed in communication with a radial outlet 30 with which the body 20 is provided. This outlet 30, which makes it possible to discharge the water, as will be explained below, leads into the recycling line 14.

A coalescer pad 32 of the known type is arranged in the inlet 18 of the separator 12. It makes it possible to increase the size of the water droplets to be recovered, so as to improve their separation.

Downstream of this pad 32, in the example which is represented, an impeller 34 is provided which is arranged immediately upstream of the hydrophilic membrane 24. This impeller makes it possible to create vortices in the flow of gas and water taken in through the inlet 18.

The mixture hence follows along an approximately helicoid path in the internal space 26, which is indicated by the arrows F. As a variant, such vortices may also be induced by replacing the impeller 34 with a tangential gas inlet.

In this way, because of the centrifugal force, the water initially present in the mixture becomes pressed against the internal walls of the membrane 24, which hence carries out the recovery of this water.

It is discharged by means of the radial outlet 30. The quality of this discharge may be improved by keeping the pressure in the external space 28 at a value lower than that prevailing in the internal space 26.

To this end, suction may be applied to the water at the outlet 30, for example by pumping. As a variant, it is also possible to utilize the pressure difference naturally existing between these internal and external spaces, 26 and 28 respectively.

The membrane 24 is such that its bubble point is higher than the pressure difference existing between the internal space 26 and the annular external space 28 during operation. This makes it possible to avoid any passage of gas toward this external space 28, so that only the water is present therein.

Figure 4:
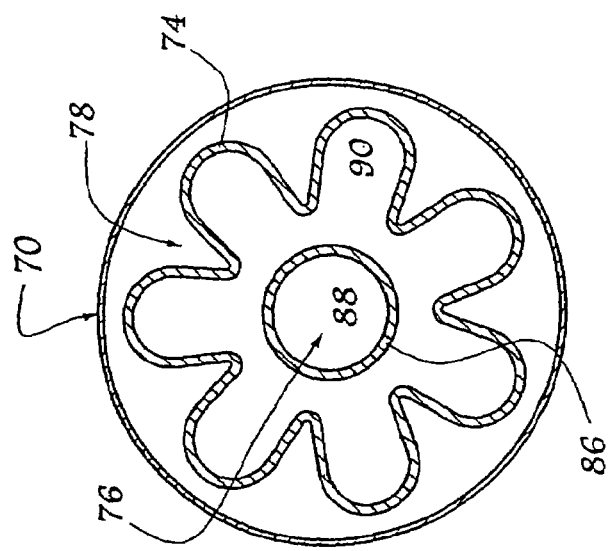
FIG. 4 is a view in section on the line IV—IV in FIG. 3.
Figure 3:
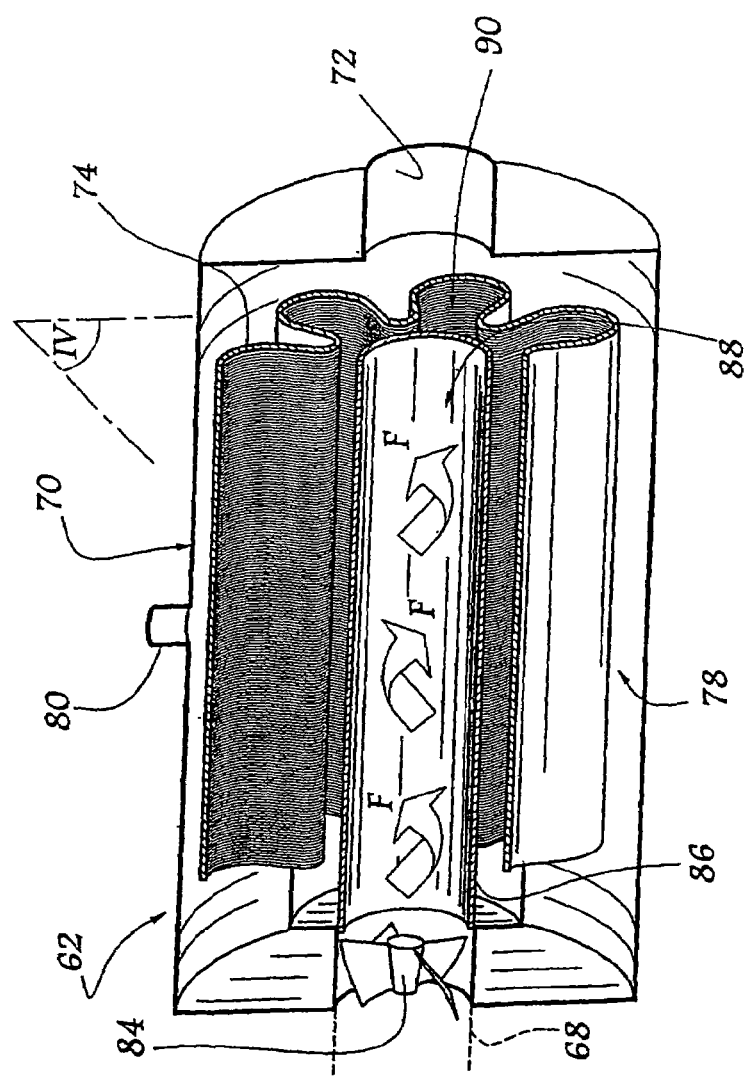
FIG. 3 is a view in section similar to FIG. 2, illustrating a phase separator according to a first alternative embodiment of the invention.

FIGS. 3 and 4 illustrate a first alternative embodiment of the invention. In these figures, the mechanical elements which are identical to those in FIG. 2 are assigned the same reference numbers, to which 50 has been added.

The separator 62 in these FIGS. 3 and 4 differs from the one 12 in FIG. 2 firstly in that the membrane 74 does not have a cylindrical profile.

Specifically, as shown by FIG. 4, this membrane 74 is involute, or folded, as viewed in a section transverse to the flow of the mixture. This makes it possible to increase the contact area of this membrane, and therefore to improve the separation.

Furthermore, an additional membrane 86 is arranged in the internal space 76 delimited by the primary membrane 74. This membrane 86 therefore separates this internal space 76 into a central region 88 and an intermediate region 90, which is annular.

The bubble point of the secondary membrane 86 is advantageously higher than the pressure difference existing between the central region 88 and the intermediate region 90. It should be noted that this pressure difference ensures substantially integral recovery of the water initially present in the central region 88. This hence avoids stagnation of this water in this region 88, and guarantees efficient separation.

A purge (not shown) may be provided on the walls of the body 70, so as to feed into the intermediate region 90. Such a purge makes it possible to discharge the air present in this intermediate region 90, and therefore to prevent this air from remaining trapped and blocking the separator.

The primary membrane 74, the bubble point of which is higher than that of the secondary membrane 86, lastly ensures recovery of all the water taken in through the inlet 68. This water is subsequently discharged through the outlet 80, in a manner similar to that which was described with reference to FIG. 2.

It should be noted that, in the exemplary embodiment of the FIGS. 3 and 4, the pressure prevailing in the central region 88 is slightly higher than that of the intermediate region 90, which is itself much higher than that prevailing in the external space 78.

FIGS. 5 and 6 illustrate another alternative embodiment. In these figures, the mechanical elements which are similar to those in FIG. 2 are assigned the same reference numbers, to which 100 has been added.

The separator 112 in FIGS. 5 and 6 differs from the one in FIGS. 2 to 4 in that it does not have an impeller. Specifically, the turbulent movement of the flow of water and gas taken in through the inlet 118 is ensured by the actual configuration of the hydrophilic membrane 124.

Here, the latter has a folded or multilobed, or involute shape, as viewed in a section transverse to the flow direction of the mixture of water and gas. It should be noted that the shape of the folds of the membrane is such that they leave a central free section 125 remaining, the transverse dimension of which is particularly small.

Furthermore, as viewed from the side in FIG. 5, the membrane 124 also has a spiral arrangement, i.e. its forms a helix overall. In this way, the mixture of water and air taken in through the inlet 118 flows along a vortex as it progresses along the membrane 124.

The embodiment of these FIGS. 5 and 6 is more particularly advantageous in economic terms. This is because it makes it possible to combine two separate functions in a single membrane, namely those of creating vortices as well as recovering the water.

The invention makes it possible to achieve the objects mentioned above.

This is because the phase separator according to the invention has a simple structure, and employs a small number of constituent elements.

Furthermore, the use of a hydrophilic membrane makes it possible to divide this separator into two separate compartments, which are respectively intended for discharging the water and the gas. In this way, the compartment reserved for the water can be provided with a lower pressure, which guarantees particularly efficient recovery thereof.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A gas and liquid phase separator apparatus, comprising:
 a) a cylindrical body,
 b) an inlet for a two-phase mixture,
 c) at least one gas outlet,
 d) a liquid outlet,
 e) at least one means to produce vortices, and
 f) at least one hydrophilic membrane, wherein said membrane is located within said body, and wherein said membrane divides said body into an internal and an external space,
 wherein said gas outlet is connected to said internal space, and
 wherein said liquid outlet is connected to said external space.

2. The apparatus according to claim 1, wherein said means to produce vortices comprise a profiled auxiliary member.

3. The apparatus according to claim 2, wherein said profiled auxiliary member is an impeller.

4. The apparatus according to claim 1, wherein said membrane produces said vortices.

5. The apparatus according to claim 4, wherein said membrane extends along a spiral and has a folded shape.

6. The apparatus according to claim 1, wherein said apparatus further comprises an additional hydrophilic membrane, wherein a secondary hydrophilic membrane is located in said internal space, and
  wherein said internal space is divided into a central and an intermediate region.

7. The apparatus according to claim 6, wherein said intermediate region comprises an outlet for purging the gas in said region.

8. The apparatus according to claim 6, wherein said secondary membrane has a bubble point lower than a primary hydrophilic membrane.

9. The apparatus according to claim 1, wherein said inlet and gas outlet are coaxial, with reference to the flow direction of the two-phase mixture, and wherein said liquid outlet is radial.

10. A method to separate a diphase mixture in a phase separator comprising the steps of:
  a) feeding said mixture into at least one inlet;
  b) deflecting said mixture into a hydrophilic membrane, wherein said membrane is located within said body, and wherein said membrane divides said body into an internal and external space,
  c) creating vortices in said mixture when it flows through said internal space; and
  d) recovering a liquid from the walls of said hydrophilic membrane.

11. An integrated energy producing apparatus comprising:
  a) at least on fuel cell comprising:
    1) anode and cathode compartments,
    2) at least two gas feed inlets, and
    3) at least two discharge outlets, and
  b) at least one two phase separator comprising:
    1) a cylindrical body,
    2) an inlet for a two-phase mixture,
    3) at least one gas outlet,
    4) a liquid outlet,
    5) at least one means to produce vortices, and
    6) at least one hydrophilic membrane, wherein said membrane is located within said body, and wherein said membrane divides said body into an internal and an external space,
  wherein said gas outlet is connected to said internal space, and
  wherein said liquid outlet is connected to said external space.

12. The apparatus according to claim 11, wherein said discharge outlets are connected to said separator.

13. The apparatus of claim 1, wherein said means to produce vortices is disposed immediately upstream of said hydrophilic membrane.

* * * * *